(12) United States Patent
Ito

(10) Patent No.: US 11,429,306 B2
(45) Date of Patent: Aug. 30, 2022

(54) INFORMATION PROCESSING APPARATUS

(71) Applicant: CANON KABUSHIKI KAISHA, Tokyo (JP)

(72) Inventor: Takehiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 16/705,045

(22) Filed: Dec. 5, 2019

(65) Prior Publication Data

US 2020/0183609 A1 Jun. 11, 2020

(30) Foreign Application Priority Data

Dec. 11, 2018 (JP) .............................. JP2018-231596

(51) Int. Cl.
*G06F 3/06* (2006.01)

(52) U.S. Cl.
CPC .......... *G06F 3/0652* (2013.01); *G06F 3/0608* (2013.01); *G06F 3/0653* (2013.01); *G06F 3/0659* (2013.01); *G06F 3/0679* (2013.01); *G06F 3/0683* (2013.01)

(58) Field of Classification Search
USPC ....................................................... 711/154
See application file for complete search history.

(56) References Cited

U.S. PATENT DOCUMENTS

| | | | | |
|---|---|---|---|---|
| 2012/0198134 | A1* | 8/2012 | Nakashita | G06F 3/0611 711/103 |
| 2012/0300260 | A1* | 11/2012 | Takizawa | G03G 15/50 358/1.16 |
| 2014/0218767 | A1* | 8/2014 | Hamaguchi | H04N 1/32587 358/1.16 |
| 2015/0106550 | A1* | 4/2015 | Hamaguchi | G06F 3/061 711/103 |
| 2016/0062660 | A1* | 3/2016 | Kunimatsu | G06F 3/0631 711/103 |
| 2017/0097790 | A1* | 4/2017 | Doo | G06F 3/0635 |
| 2020/0065025 | A1* | 2/2020 | Hong | G06F 3/0679 |

FOREIGN PATENT DOCUMENTS

JP 2018-063676 A 4/2018

* cited by examiner

*Primary Examiner* — Charles Rones
*Assistant Examiner* — Jonah C Krieger
(74) *Attorney, Agent, or Firm* — Canon U.S.A., Inc. I.P. Division

(57) ABSTRACT

A comparison unit configured to compare volume of unnecessary data of a first semiconductor memory to a threshold of the first semiconductor memory, which is set in advance, and a transmission unit configured to transmit a delete command to the first semiconductor memory in accordance with a comparison result indicating that the volume of the unnecessary data of the first semiconductor memory is larger than the threshold of the first semiconductor memory are provided, and the transmission unit transmits a delete command to the second semiconductor memory upon transmission of the delete command to the first semiconductor memory.

14 Claims, 4 Drawing Sheets

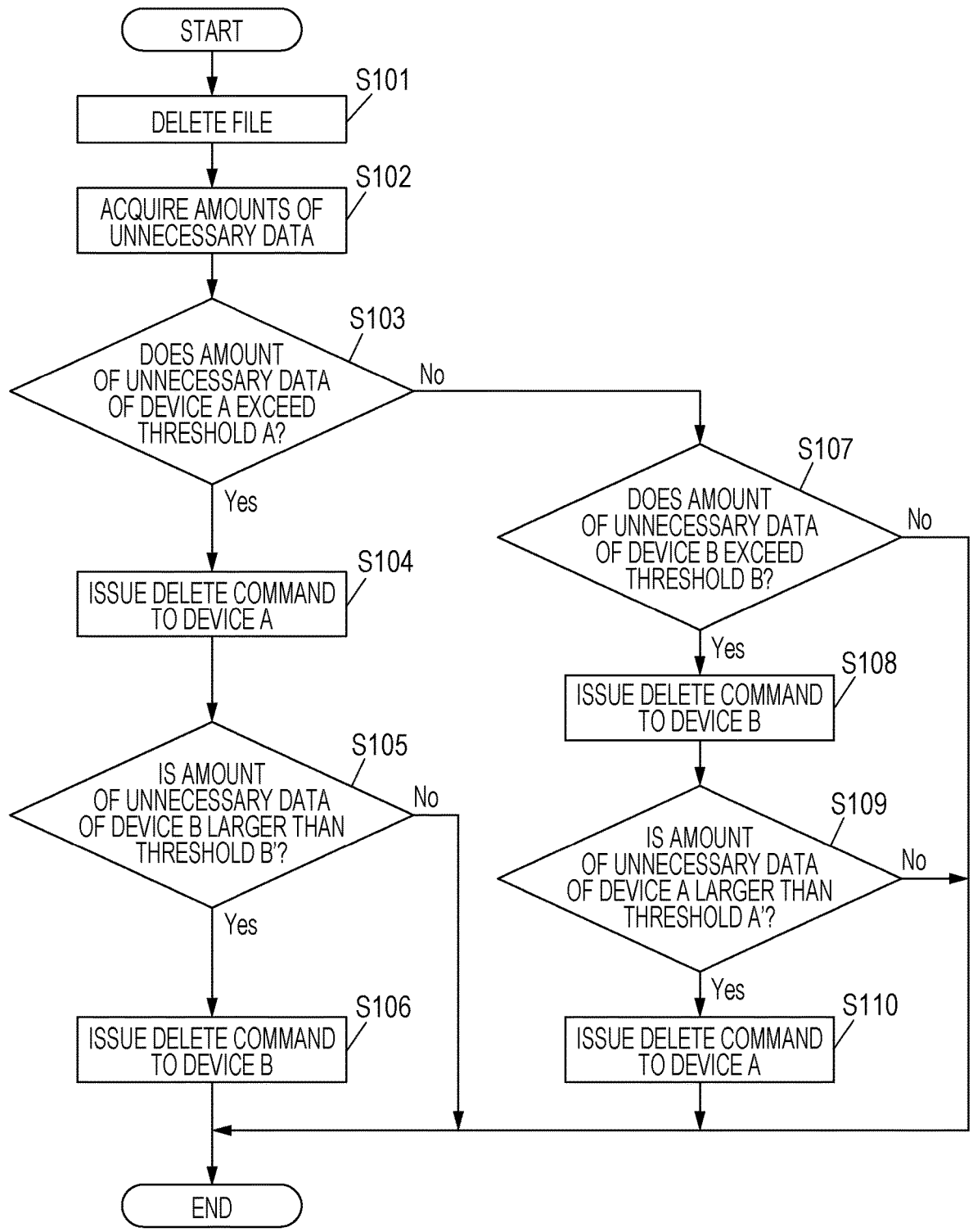

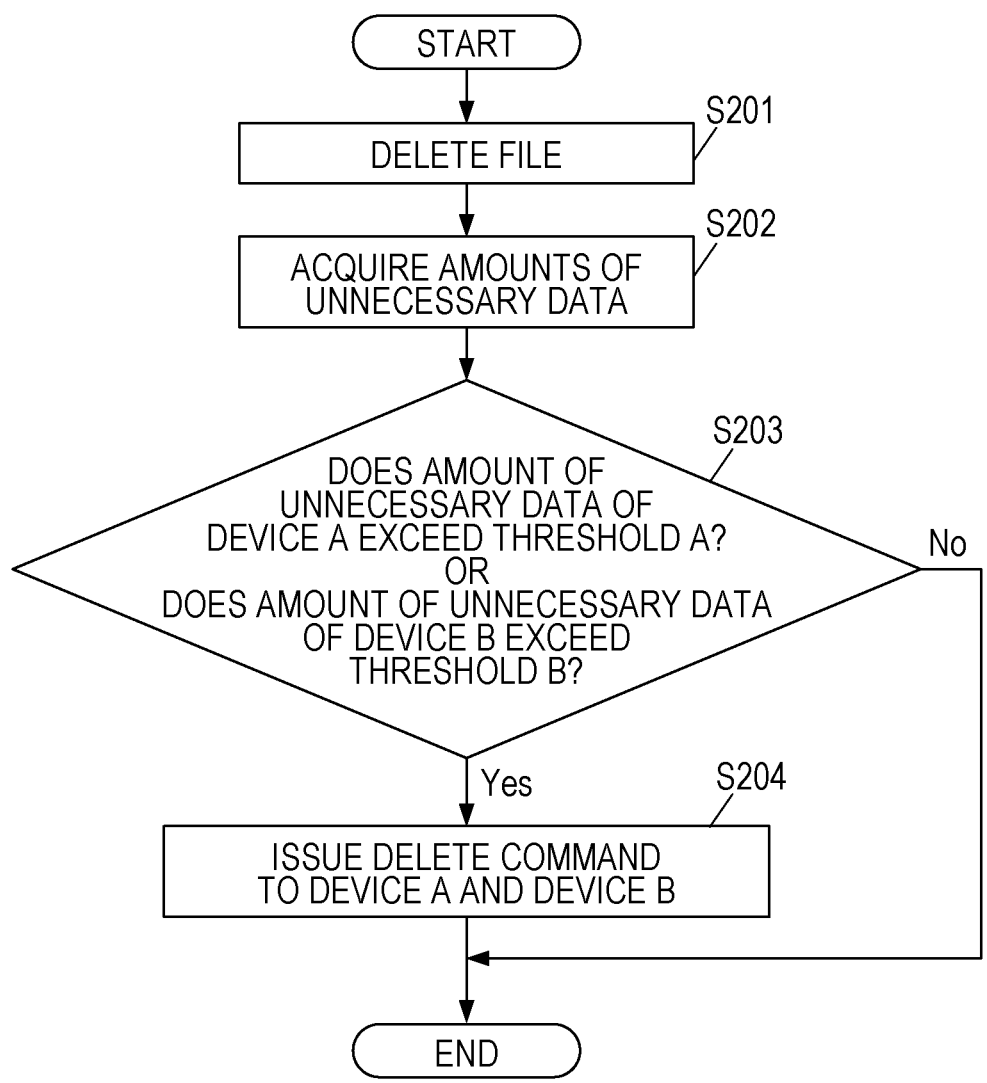

INFORMATION PROCESSING APPARATUS

BACKGROUND

Field of the Disclosure

The present disclosure relates to an information processing apparatus.

Description of the Related Art

With miniaturization and capacity increase of an NAND flash memory, an eMMC (embedded Multi Media Card), a UFS (Universal Flash Storage), and an SSD (solid-state drive) have been recently used as storing devices. Some systems such as a PC (Personal Computer) and an MFP (Multi-Function Peripheral) have a device with a system configuration using an eMMC as a boot or a small-capacity storage space and using an SSD as a large storage capacity.

In flash memory devices such as an eMMC, a UFS, and an SSD, when data writing is continuously performed, a writing performance is deteriorated due to a structural problem of a flash memory that overwriting of unnecessary data is not allowed. The unnecessary data is data that has been deleted in a file system, but is actual data remaining in a physical storage area of the flash memory device. For deleting the unnecessary data, the actual data needs to be deleted.

In order to prevent the deterioration of the writing performance, a delete command (Trim command) exists. The delete command is issued from a host (operating system) to an SSD. The SSD receiving the delete command releases charge in a block unit in an unnecessary data area and charges all cells in the block to thereby initialize the block. By initializing the block, the SSD is able to perform writing immediately after writing is performed from the host.

Japanese Patent Laid-Open No. 2018-063676 provides a mirroring system in which two SSDs are mounted for mirroring and the two SSDs are controlled by a mirroring apparatus. A controller regards the mirroring system as one storing device. That is, the controller issues one delete command to the mirroring system. Then, a memory controller included in the mirroring system receiving the delete command issues a delete command to the two SSDs at the same time in accordance with the received delete command

SUMMARY

The disclosure provides an information processing apparatus including at least a first semiconductor memory and a second semiconductor memory that respond to a delete command, the information processing apparatus including a comparison unit configured to compare volume of unnecessary data of the first semiconductor memory to a threshold of the first semiconductor memory, which is set in advance, and a transmission unit configured to transmit a delete command to the first semiconductor memory in accordance with a comparison result indicating that the volume of the unnecessary data of the first semiconductor memory is larger than the threshold of the first semiconductor memory, in which the transmission unit transmits a delete command to the second semiconductor memory upon transmission of the delete command to the first semiconductor memory.

Further features of the present disclosure will become apparent from the following description of exemplary embodiments with reference to the attached drawings.

BRIEF DESCRIPTION OF THE DRAWINGS

FIG. 3 is a flowchart of Embodiment 1.

FIG. 4 is a flowchart of Embodiment 2.

DESCRIPTION OF THE EMBODIMENTS

Each of the embodiments of the disclosure will be described in detail with reference to accompanying drawings. Here, an image forming apparatus is used as an example of an information processing apparatus. Note that, the following embodiments are not intended to limit the disclosure according to the scope of the claims, and not all combinations of features described in the embodiments are essential to implement the disclosure.

Embodiment 1

Figure 1:
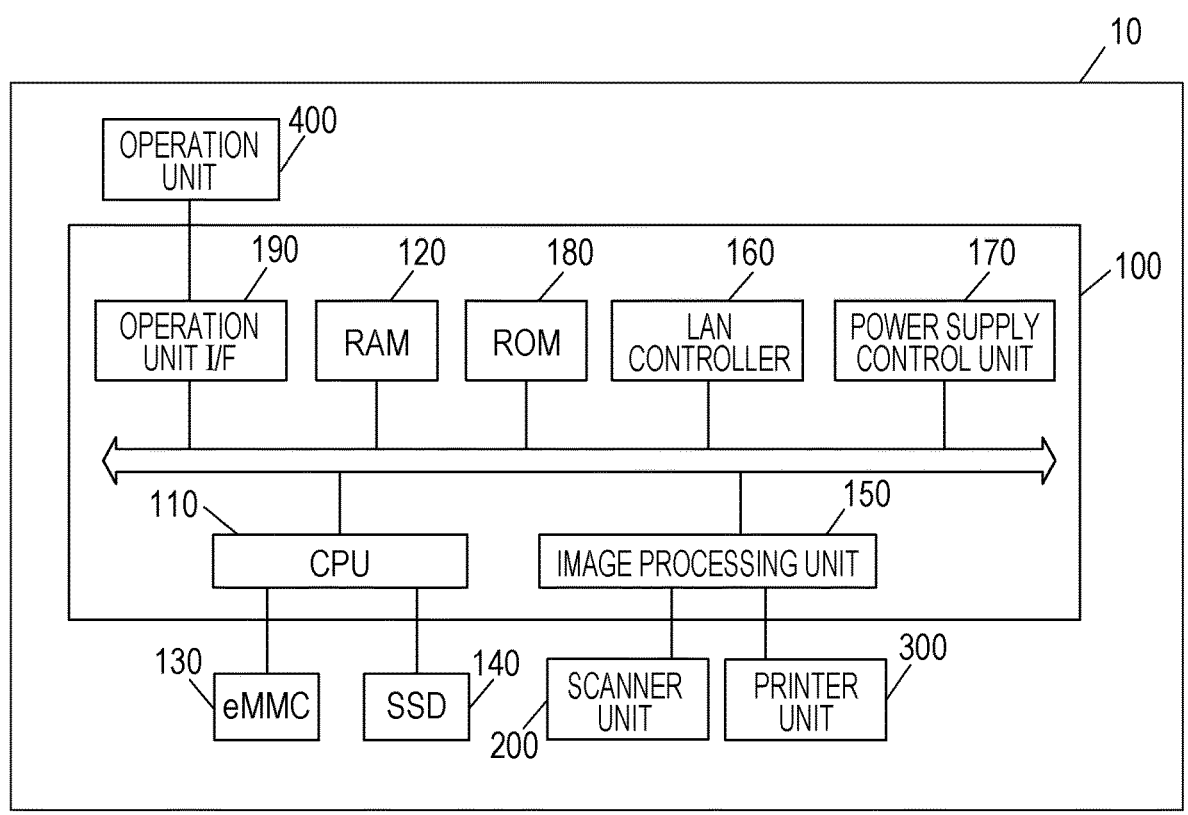
FIG. 1 is a simple block diagram of an image forming apparatus.

FIG. 1 is a simple block diagram of an image forming apparatus 10.

The image forming apparatus 10 is constituted by a main controller unit 100, a scanner unit 200, a printer unit 300, and an operation unit 400.

The main controller unit 100 is connected to the scanner unit 200, the printer unit 300, and the operation unit 400. The main controller unit 100 includes a CPU 110, a RAM 120, an eMMC 130, an SSD 140, an image processing unit 150, a LAN controller 160, a power supply control unit 170, and an operation unit I/F 190.

The eMMC 130 stores, for example, boot data for activating a system, and job history data of copy, PDL, or the like. The SSD 140 stores, for example, an application displayed in the operation unit 400 and is used as a spool area of image data when a job of copy or PDL is executed. Note that, the eMMC 130 and the SSD 140 are semiconductor memories that respond to a delete command described later.

When power is supplied from the power supply control unit 170, the CPU 110 reads the boot data from the eMMC 130 and develops data of the application or the like from the SSD 140 to the RAM 120 to perform activation.

A ROM 180 stores, for example, a program related to activation of the main controller unit 100, a fixed parameter, a threshold described below, and the like.

The RAM 120 is used, for example, to store a program or temporal data when the CPU 110 controls the image forming apparatus 10. Note that, the program or the temporal data stored in the RAM 120 is read out from the ROM 180, the SSD 140, or the like.

The LAN controller 160 is connected to the CPU 110 by a system bus and receives print data through an Ethernet I/F from a device, such as a PC. The received print data is temporarily saved by the CPU 110 in the SSD 140 via the RAM 120, subjected to image processing in the image processing unit 150, and then, subjected to print processing in the printer unit 300 through a printer I/F (not illustrated). The CPU 110 performs transmission of the data subjected to the image processing from the image processing unit 150 to the printer I/F, and simultaneously performs writing of information of the print data in the eMMC 130.

The scanner unit 200 reads a document, creates electronic data of the read document, and transmits the data to the image processing unit 150 through a scanner I/F (not illustrated). After image processing is performed in the image processing unit 150, print processing is performed in the printer unit 300 through the printer I/F. The CPU 110 performs transmission of the data subjected to the image processing from the image processing unit 150 to the printer I/F, and simultaneously performs writing of information of the print data in the eMMC 130.

The operation unit 400 displays the data transmitted from the CPU 110 through the operation unit I/F 190, and when an input to the operation unit 400 is performed by a user, the operation unit 400 notifies the CPU 110 of a content of the input.

The CPU 110 writes temporarily saved data (spool data) of image data in the spool area of the SSD 140 when a job of copy, PDL, or the like is executed, but the spool data becomes unnecessary after the job is executed, the CPU 110 deletes the spool data after the job is executed. When receiving, from the CPU 110, a command to delete the spool data, the SSD 140 cancels a link table and is brought into a state where unnecessary actual data, even though being deleted in a system, remains in a storage area of the SSD 140.

When the amount of the unnecessary actual data increases, the CPU 110 issues a delete command (Trim command) to the SSD 140, and deletes the unnecessary actual data of the SSD 140. When receiving the delete command from the CPU 110, the SSD 140 releases charge in a block unit in an unnecessary data area and charges all cells in the block to thereby initialize the block.

Figure 2:
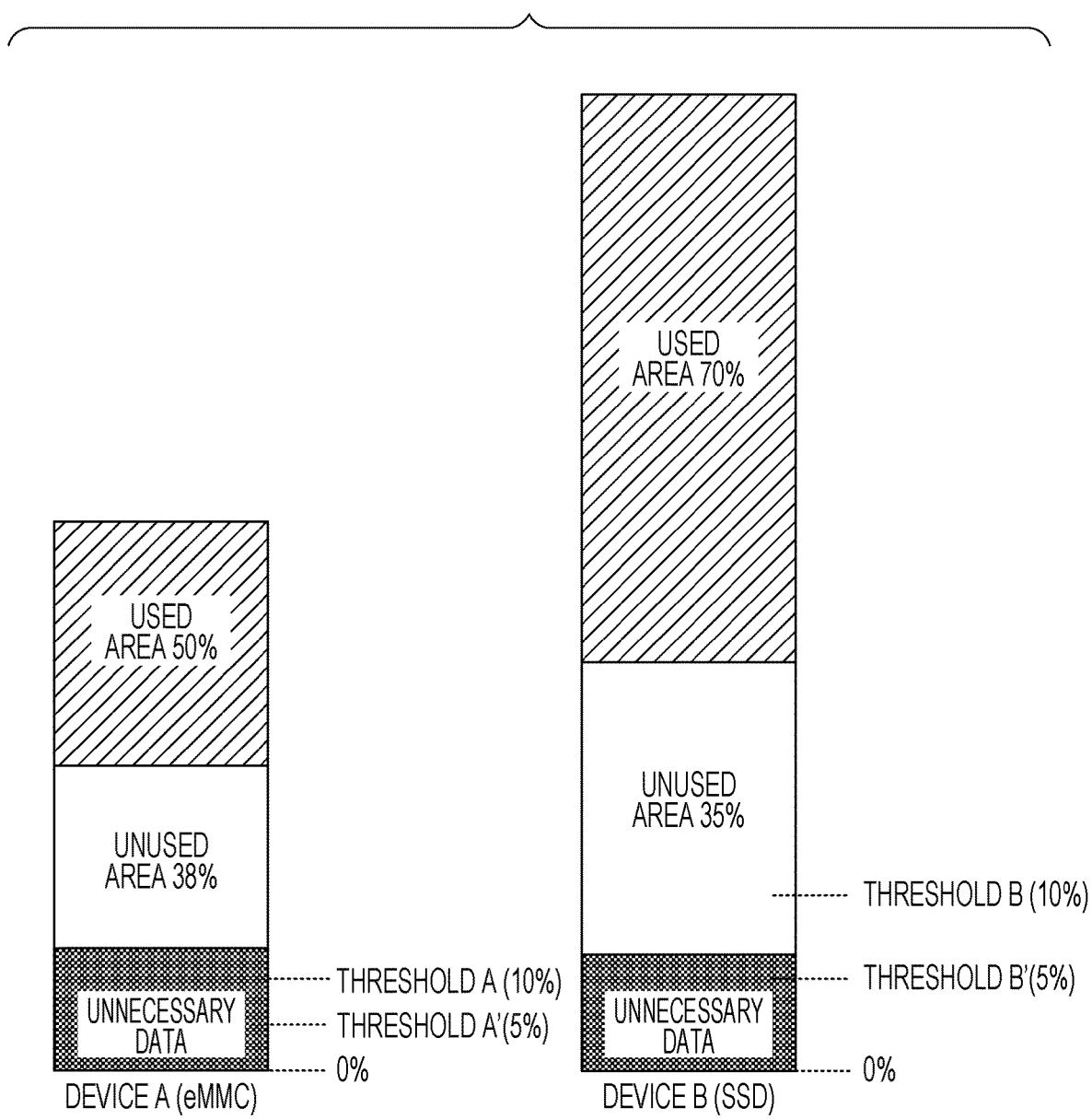
FIG. 2 illustrates use status of a storage area of a device A and a storage area of a device B.

FIG. 2 illustrates an example of use status of a storage area of a device A that is a semiconductor memory and a storage area of a device B that is a semiconductor memory.

In the present embodiment, description will be given by assuming that the device A is the eMMC 130 and the device B is the SSD 140, but another flash memory device may be used.

The eMMC 130 that is the device A is a device having a smaller capacity than that of the SSD 140 and stores, for example, information about bootable data for activating the system and about print data written when a job of copy, PDL, or the like is executed.

The SSD 140 that is the device B is a device having a larger capacity than that of the eMMC 130 and is used to spool image data when copy or PDL is executed.

In the example illustrated in FIG. 2, the use status of the data in the eMMC 130 indicates 50% in a used area, 38% in an unused area, and 12% in an unnecessary data area. A threshold of the eMMC 130 is assumed in such a manner that a threshold A is 10% and a threshold A' is 5%. Since the unnecessary data of the eMMC 130 occupies 12% of a whole, the unnecessary data of the device A exceeds the threshold A and the threshold A'. Note that, the threshold A and the threshold A' are set in advance, but may be variable.

In the example illustrated in FIG. 2, the use status of the data in the SSD 140 indicates 70% in a used area, 35% in an unused area, and 7% in an unnecessary data area. A threshold of the SSD 140 is assumed in such a manner that a threshold B is 10% and a threshold B' is 5%. Since the unnecessary data of the SSD 140 occupies 7% of a whole, the unnecessary data of the device B is smaller than the threshold B and larger than the threshold B'. Note that, the threshold B and the threshold B' are set in advance, but may be variable.

FIG. 3 illustrates an example of a flowchart of delete processing of Embodiment 1. In Embodiment 1, when an amount of unnecessary data of the device A exceeds a threshold, the CPU 110 issues a delete command to the device A, and when a threshold of an amount of unnecessary data of the other device B falls in a certain range, the CPU 110 issues a delete command to the device B.

In the present embodiment, description will be given by assuming that the device A is the eMMC 130 and the device B is the SSD 140. Though description will be given by taking two flash memories as an example in the present embodiment, the number thereof may be two or more.

At step S101, the CPU 110 deletes a file of the eMMC 130. Step S101 includes cases where, for example, a user instructs the CPU 110 to delete the file by the operation unit 400 and data of the eMMC 130 is deleted or data associated with completion of execution of a copy job or a PDL job is deleted, etc.

After step S101 ends, the procedure shifts to step S102.

At step S102, the CPU 110 acquires amounts of unnecessary data (unnecessary data capacities) of the eMMC 130 and the SSD 140. After step S102 ends, the procedure shifts to step S103.

At step S103, the CPU 110 determines whether or not the amount of the unnecessary data of the eMMC 130 exceeds the threshold A. That is, the CPU 110 compares the amount of the unnecessary data to the threshold. The unnecessary data is data that has been deleted in a file system but is data whose actual data physically remains in a storage area of a flash memory device. When the amount of the unnecessary data of the eMMC 130 exceeds the threshold A (comparison result), the procedure shifts to step S104.

At step S104, the CPU 110 issues a delete command to the eMMC 130. Upon reception of the delete command, the eMMC 130 releases charge of a block of the unnecessary data and charges all cells in the block to thereby initialize the block. After step S104 ends, the procedure shifts to S105.

At step S105, the CPU 110 determines whether or not the amount of the unnecessary data of the SSD 140 is larger than the threshold B'. When the amount of the unnecessary data of the SSD 140 is equal to or smaller than the threshold B' at step S105, the flowchart of the delete processing ends. On the other hand, when the amount of the unnecessary data of the SSD 140 is larger than the threshold B', the procedure shifts to step S106.

At step S106, the CPU 110 issues a delete command to the SSD 140. Upon reception of the delete command, the SSD 140 releases charge of a block of the unnecessary data and charges all cells in the block to thereby initialize the block. After step S106 ends, the flowchart of the delete processing ends.

Description will be given back to step S103. When the amount of the unnecessary data of the eMMC 130 is equal to or less than the threshold at step S103, the procedure shifts to step S107.

At step S107, whether or not the amount of the unnecessary data of the SSD 140 exceeds the threshold B is determined. When not exceeding the threshold B at step S107 (comparison result), the flowchart of the delete processing ends. On the other hand, when exceeding the threshold B at step S107 (comparison result), the procedure shifts to step S108.

At step S108, the CPU 110 issues a delete command to the SSD 140. Upon reception of the delete command, the SSD 140 releases charge of a block of the unnecessary data and charges all cells in the block to thereby initialize the block. After step S108 ends, the procedure shifts to step S109.

At step S109, the CPU 110 checks whether the amount of the unnecessary data of the eMMC 130 is larger than the threshold A'. When the amount of the unnecessary data of the eMMC 130 is equal to or smaller than the threshold A', the flowchart of the delete processing ends. On the other hand, when the amount of the unnecessary data of the eMMC 130 is larger than the threshold A', the procedure shifts to step S110.

At step S110, the CPU 110 issues a delete command to the eMMC 130. Upon reception of the delete command, the eMMC 130 releases charge of a block of the unnecessary data and charges all cells in the block to thereby initialize the block. After step S110 ends, the flowchart of the delete processing ends.

As described above, according to a configuration of the present embodiment, when a delete command is issued to the device A, whether or not to issue a delete command to the device B is checked, so that delete command processing of the device A and the device B is able to be performed at the same time. Such a configuration makes it possible to prevent deterioration of an entire performance of the system.

Further, in a case where the device A does not exceed the threshold but the device B exceeds the threshold so that a delete command is issued to the device B, by reducing the threshold of the device A, the delete command processing of the device A and the device B is able to be performed at the same time. Such a configuration makes it possible to prevent deterioration of an entire performance of the system.

Embodiment 2

FIG. 4 illustrates a flowchart of delete processing in the present embodiment. The present embodiment is a modification of Embodiment 1 and is different in the flowchart of the delete processing. The other configuration is similar to that of Embodiment 1. Though description will be given by assuming that the device A is the eMMC 130 and the device B is the SSD 140 also in the present embodiment, they may be inverted. Further, though description will be given by taking two flash memory devices as an example in the present embodiment, the number thereof may be two or more.

The present embodiment is different from Embodiment 1 in that, when an amount of unnecessary data of the eMMC 130 or the SSD 140 exceeds a threshold, the CPU 110 issues a delete command to the eMMC 130 and the SSD 140 at the same time.

At step S201, the CPU 110 deletes a file of the eMMC 130. It is assumed that, at step S201, for example, a user deletes a file by the operation unit 400 and data of the eMMC 130 is deleted.

At step S202, the CPU 110 acquires amounts of unnecessary data of the eMMC 130 and the SSD 140. Note that, though an example in which the amounts of the unnecessary data of the eMMC 130 and the SSD 140 are acquired is illustrated here, at least the amount of the unnecessary data of the eMMC 130 whose file has been deleted may be acquired.

At step S203, the CPU 110 determines whether or not the amount of the unnecessary data of the eMMC 130 exceeds the threshold A. That is, the CPU 110 compares the amount of the unnecessary data to the threshold.

At step S203, when any of the device A and the device B exceeds the threshold (comparison result), the procedure shifts to step S204, and when both of the devices do not exceed the threshold, the procedure ends.

Note that, at step S203, whether or not the amount of the unnecessary data of the SSD 140 whose file has not been deleted exceeds the threshold B may be determined. For example, when it is determined that the amount of the unnecessary data of the eMMC 130 does not exceed the threshold A, the CPU 110 determines whether or not the amount of the unnecessary data of the SSD 140 exceeds the threshold B. Then, when it is determined that the amount of the unnecessary data of the SSD 140 exceeds the threshold B, the procedure shifts to step S204.

At step S204, the CPU 110 issues a delete command to the device A and the device B at the same time. Then, upon reception of the delete command, the eMMC 130 and the SSD 140 release charge of a block of the unnecessary data and charge all cells in the block to thereby initialize the block.

As described above, according to a configuration of the present embodiment, when the amount of the unnecessary data of at least one of the devices exceeds the threshold, the delete command processing of the device A and the device B is able to be performed at the same time. Such a configuration makes it possible to prevent deterioration of an entire performance of the system.

Note that, the following description is common in Embodiment 1 and Embodiment 2.

When the file of the SSD 140 is deleted at step S101 and step S201, the device A is the SSD 140 and the device B is the eMMC 130.

In addition, though a configuration in which deletion of the file starts the flowchart of delete processing is illustrated, there is no limitation thereto. For example, the flowchart after step S102 (S202) may be performed at timing when the user turns off power of the image forming apparatus. Moreover, the flowchart after step S103 (S203) may be performed when the CPU 110 acquires information of an available capacity of the device A or the device B at predetermined timing.

Further, though a configuration in which the amount of the unnecessary data is acquired at step S102 and S202 is illustrated, for example, a configuration in which volume information is acquired from each of the devices and the amount of the unnecessary data is included in the volume information may be provided. For example, when the CPU 110 deletes the file, the amount of the unnecessary data, to which volume of the deleted data is added, may be managed. When the management is performed by the CPU 110, management information is stored in any of the eMMC 130 and the SSD 140.

Other embodiment

While various examples and embodiments of the disclosure have been described above, the spirit and scope of the disclosure are not limited to specific description within the present specification.

The disclosure is also able to be realized by processing in which a program that realizes one or more functions of the aforementioned embodiments is supplied to a system or an apparatus via a network or a storage medium and one or more processors in a computer of the system or the apparatus reads out and performs the program. Moreover, the disclosure is able to be realized also by a circuit (for example, an ASIC) that realizes one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-231596 filed Dec. 11, 2018, which is hereby incorporated by reference herein in its entirety.

What is claimed is:

1. An information processing apparatus with a plurality of semiconductor memories which are non-volatile including at least a first semiconductor memory that responds to a delete command and a second semiconductor memory that responds to a delete command, the information processing apparatus comprising:
   a controller that compares a volume of unnecessary data of one of the plurality of semiconductor memories to a threshold of the one of the plurality of semiconductor memories and transmits a delete command based on a result of the comparison,
   wherein the controller
   compares a volume of unnecessary data of the first semiconductor memory to a first threshold of the first semiconductor memory, which is set in advance,
   compares a volume of unnecessary data of the second semiconductor memory to a second threshold in response to a first condition with respect to the first threshold of the first semiconductor memory being satisfied by the volume of the unnecessary data of the first semiconductor memory, and
   transmits the delete command to the first semiconductor memory in response to a second condition, which is different from the first condition, with respect to the first threshold being satisfied by the volume of the unnecessary data of the first semiconductor memory, and after transmitting the delete command, compares the volume of the unnecessary data of the second semiconductor memory to a third threshold which is smaller than the second threshold.

2. The information processing apparatus according to claim 1, wherein
   the controller
   transmits the delete command to the first semiconductor memory in accordance with a comparison result indicating that the volume of the unnecessary data of the first semiconductor memory is larger than the first threshold, and after transmitting the delete command, compares the volume of the unnecessary data of the second semiconductor memory to the third threshold, and
   compares the volume of the unnecessary data of the second semiconductor memory to the second threshold in accordance with a comparison result indicating that the volume of the unnecessary data of the first semiconductor memory is equal to or smaller than the first threshold.

3. The information processing apparatus according to claim 1, further comprising
   a first interface that receives an instruction from a user, wherein
   upon reception of an instruction to delete data stored in the first semiconductor memory, the controller compares the volume of the unnecessary data of the first semiconductor memory to the first threshold.

4. The information processing apparatus according to claim 1, further comprising
   a second interface that receives a job, wherein
   predetermined data is stored in the first semiconductor memory when the job is executed, and
   upon deletion of the predetermined data after execution of the job is completed, the controller compares the volume of the unnecessary data of the first semiconductor memory to the first threshold.

5. The information processing apparatus according to claim 2, wherein
   the controller compares the volume of the unnecessary data of the first semiconductor memory to a fourth threshold which is smaller than the first threshold based on a comparison result indicating that the volume of the unnecessary data of the second semiconductor memory is larger than the third threshold.

6. The information processing apparatus according to claim 1, wherein
   the controller acquires the volume of the unnecessary data of the first semiconductor memory from the first semiconductor memory and acquires the volume of unnecessary data of the second semiconductor memory from the second semiconductor memory.

7. The information processing apparatus according to claim 1, wherein
   the controller adds the volume of the unnecessary data of the first semiconductor memory in accordance with deletion of data stored in the first semiconductor memory, and adds the volume of the unnecessary data of the second semiconductor memory in accordance with deletion of data stored in the second semiconductor memory.

8. The information processing apparatus according to claim 1, wherein
   the first semiconductor memory is an SSD (Solid State Drive) and the second semiconductor memory is an eMMC (Embedded Multimedia Card).

9. The information processing apparatus according to claim 1,
   wherein the first semiconductor memory is an eMMC (Embedded Multimedia Card) and the second semiconductor memory is an SSD (Solid State Drive).

10. The information processing apparatus according to claim 2, wherein the controller transmits the delete command to the second semiconductor memory in accordance with a comparison result indicating that the volume of the unnecessary data of the second semiconductor memory is larger than the third threshold.

11. The information processing apparatus according to claim 5, wherein
the controller transmits the delete command to the second semiconductor memory in accordance with a comparison result indicating that the volume of the unnecessary data of the second semiconductor memory larger than the second threshold.

12. The information processing apparatus according to claim 5, wherein
the controller transmits the delete command to the first semiconductor memory in accordance with a comparison result indicating that the volume of the unnecessary data of the first semiconductor memory is equal to or smaller than the fourth threshold.

13. The information processing apparatus according to claim 5, wherein
the first threshold, the second threshold, the third threshold and the fourth threshold each indicate a ratio of volume of unnecessary data to a storage area of a semiconductor memory,
the first threshold and the third threshold indicate a same ratio, and
the second threshold and the fourth threshold indicate a same ratio.

14. The information processing apparatus according to claim 1, wherein
a total capacity of the first semiconductor memory and a total capacity of the second semiconductor memory differ from each other.

\* \* \* \* \*